Dec. 22, 1959     R. E. BELL     2,918,246
UNIVERSAL WEIGHT CUTOFF DEVICE
Filed Aug. 8, 1955     6 Sheets-Sheet 1
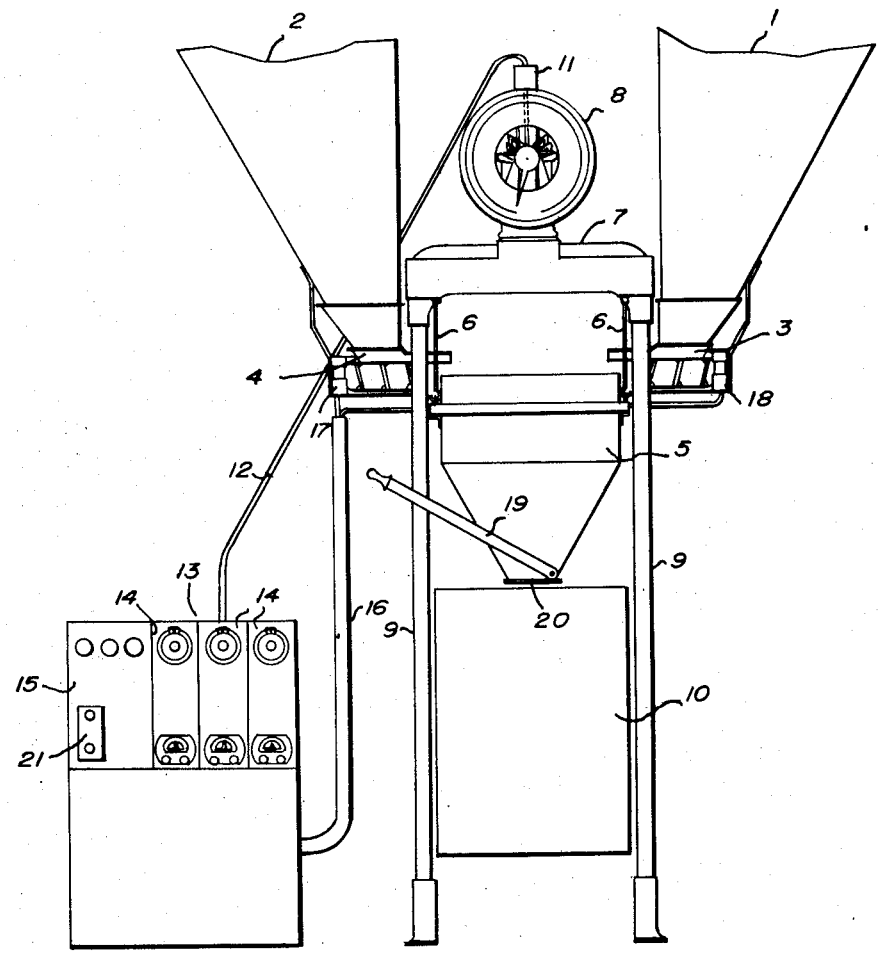
*Fig. I*
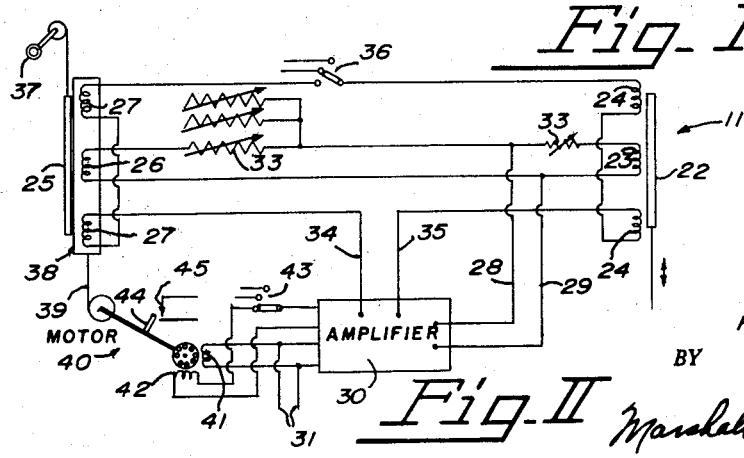
*Fig. II*
INVENTOR.
ROBERT E. BELL
BY
Marshall, Marshall & Heath
ATTORNEYS

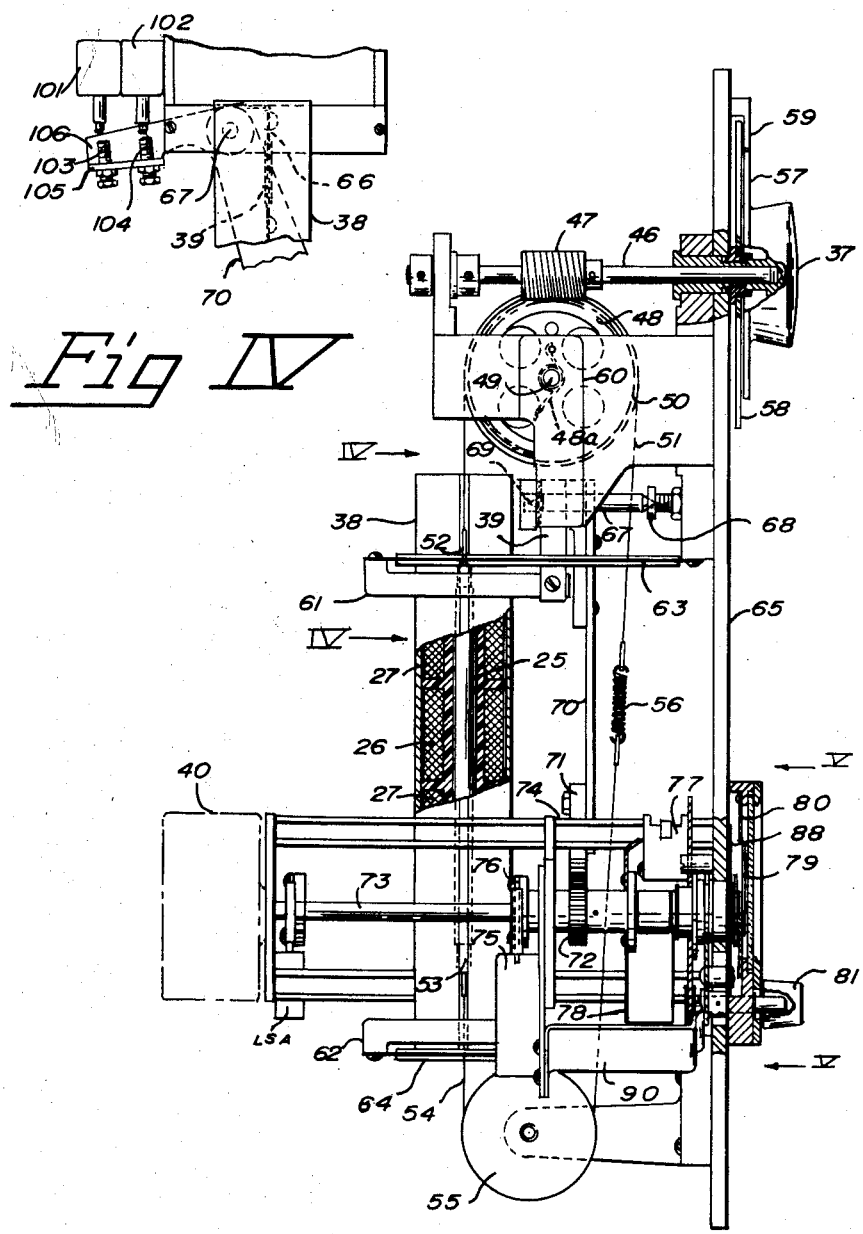

Dec. 22, 1959 R. E. BELL 2,918,246
UNIVERSAL WEIGHT CUTOFF DEVICE
Filed Aug. 8, 1955 6 Sheets-Sheet 3
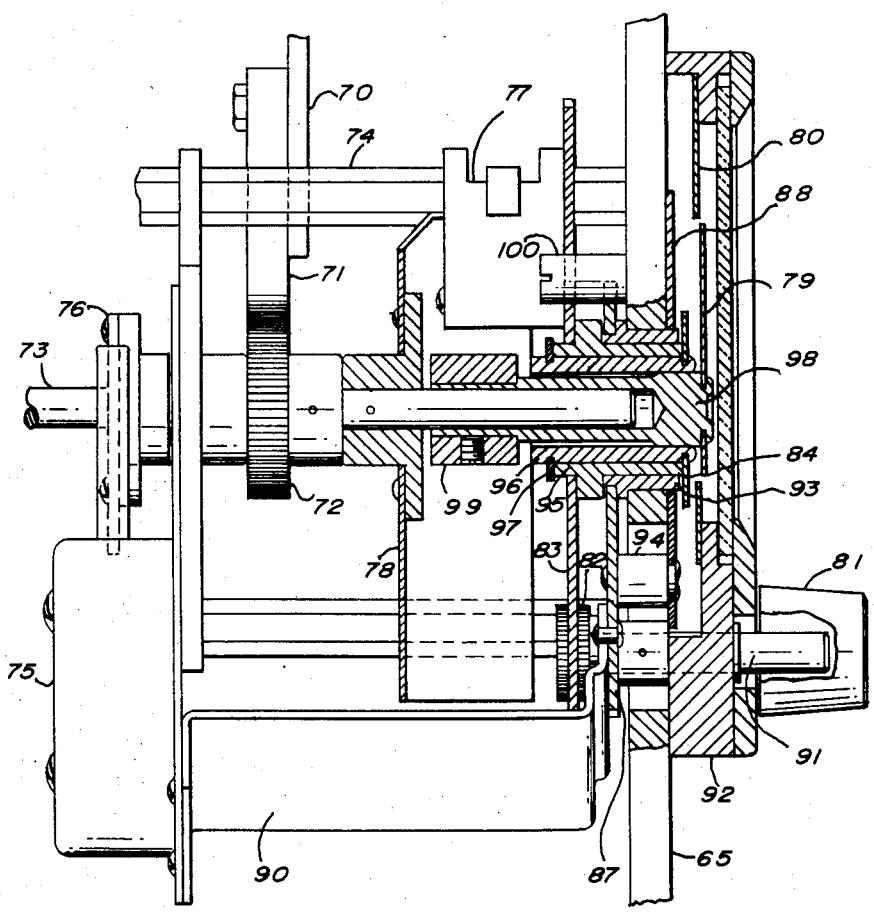
*Fig VI*
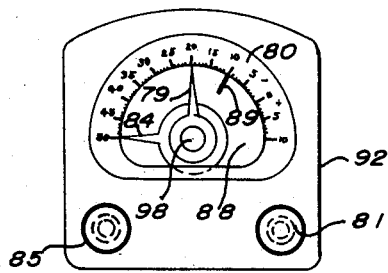
*Fig V*
INVENTOR.
ROBERT E. BELL
BY
Marshall, Marshall & Heasting
ATTORNEYS Dec. 22, 1959     R. E. BELL     2,918,246
UNIVERSAL WEIGHT CUTOFF DEVICE
Filed Aug. 8, 1955     6 Sheets-Sheet 4
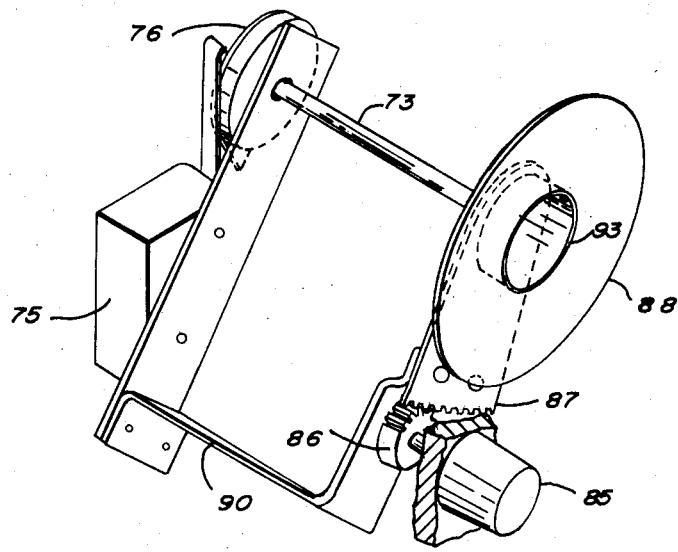
*Fig. VII*
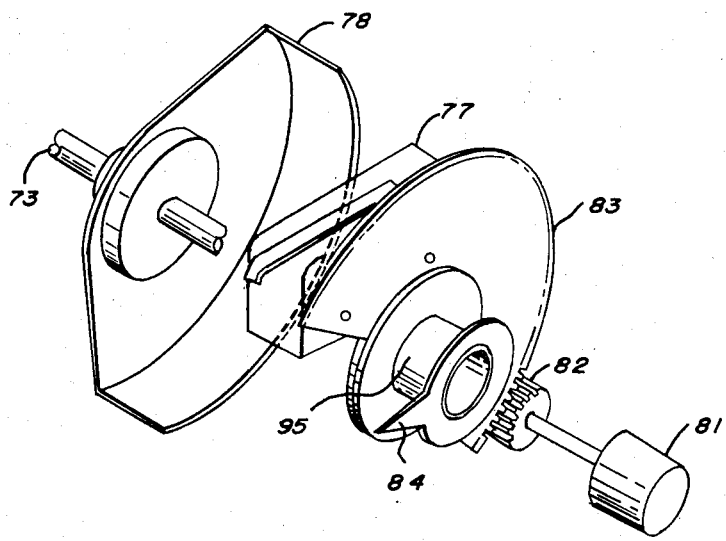
*Fig. VIII*
INVENTOR.
ROBERT E. BELL
BY
Marshall, Marshall & Heating
ATTORNEYS

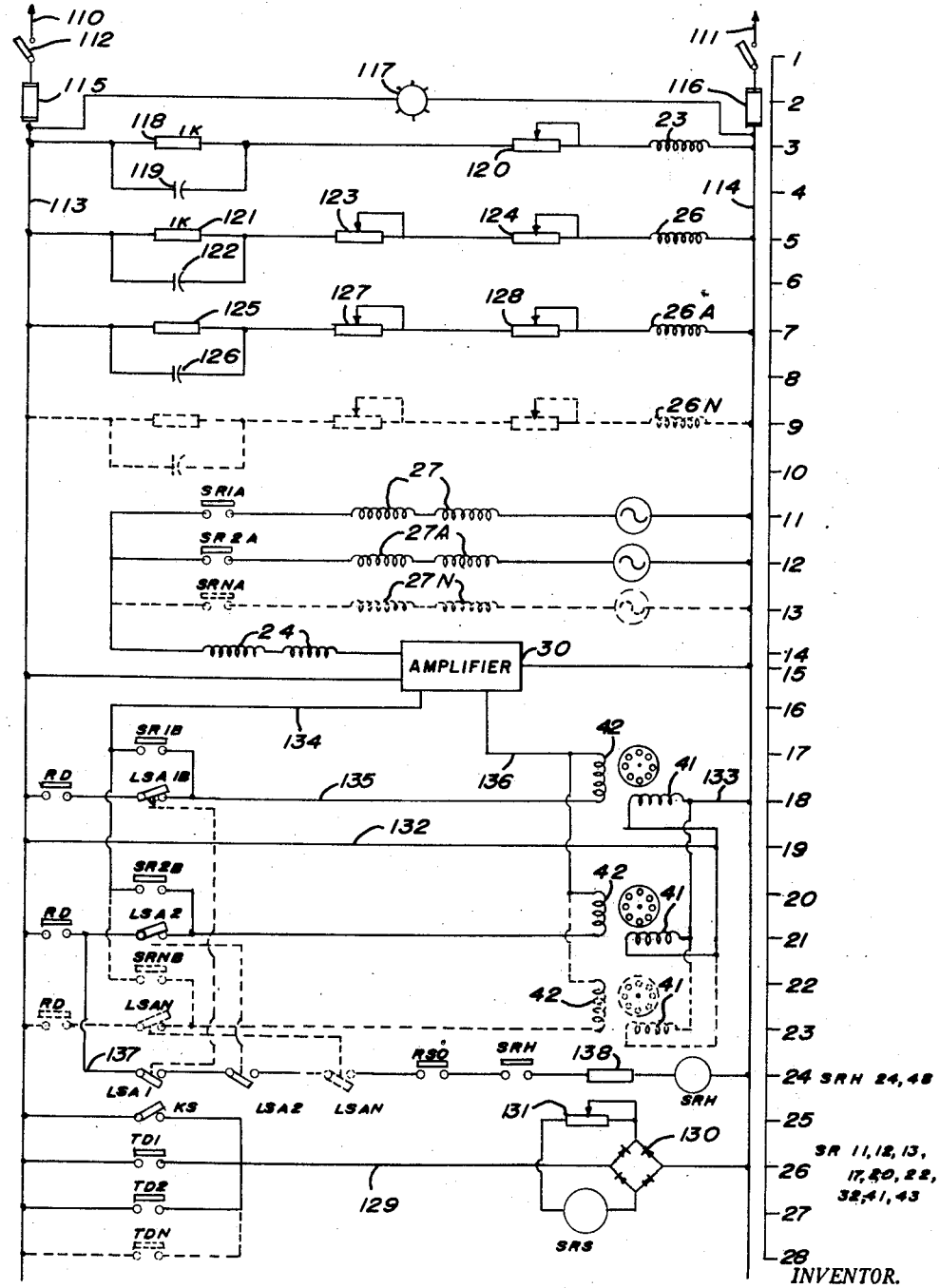

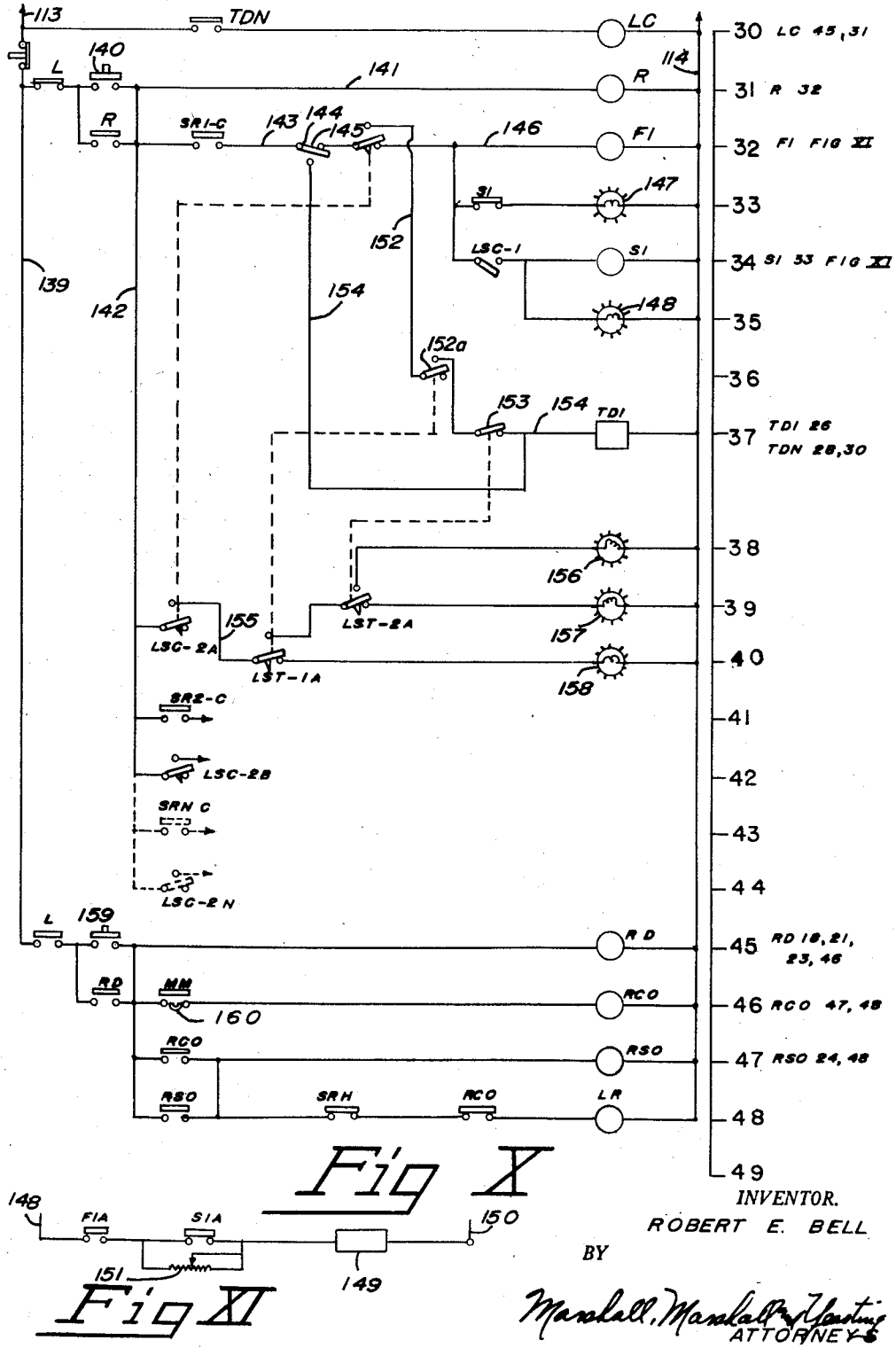

United States Patent Office

2,918,246
Patented Dec. 22, 1959

2,918,246

UNIVERSAL WEIGHT CUTOFF DEVICE

Robert E. Bell, Toledo, Ohio, assignor, by mesne assignments, to Toledo Scale Corporation, Toledo, Ohio, a corporation of Ohio Application August 8, 1955, Serial No. 526,986

9 Claims. (Cl. 249—14)

This invention relates to weighing scale equipment and in particular to auxiliary control equipment for use with weighing scales adapted to weigh out ingredients for batches of materials.

Complex weighing scale equipment has been constructed for metering out or weighing out the various ingredients making up batches of materials. This type of equipment is widely used in the mixing of concrete and in various manufacturing processes such as the manufacture of paint, glass, synthetic resins, soap and various other products. The majority of these weighing scale installations are custom built and practically all of the control equipment is built special for each particular job. As a result these systems are usually very expensive.

Batching control equipment as ordinarily constructed is usually quite difficult to adjust for various batches, since the control switches must be located on the weighing scale operating mechanism where the switches may be responsive to the load on the weighing scale. This requires that the control switches be located remotely from the control room and forces the operator to go from scale to scale to set up the controls for the specific quantities of the various ingredients that go into a batch.

The principal object of this invention is to provide a weighing scale with a remote indicating device capable of operating or controlling the feeders that are used to feed material onto a weighing scale hopper or from the hopper.

Another object of the invention is to provide a batching scale control system wherein the controls are centrally located and in which there is no indication at the weighing scale itself of the ingredients or quantities of ingredients that are used in any particular batch.

A still further object of the invention is to provide a batching control system in which the weights of each of the ingredients for a particular batch are indicated on the control mechanism until the batch is completed.

A still further object of the invention is to provide a control system having remote indication and remote setting of the quantities of material arranged such that each of the materials must be accurately weighed into the weighing hopper before another material may be added or before the system may be discharged.

More specific objects and advantages are apparent from the following description of a preferred embodiment of the invention.

According to the invention, the improved weighing scale control mechanism comprises a data transmitter on each of the weighing scales for transmitting a signal indicative of the weight then in the load receiver of that particular scale. At the remote or control station, a plurality of data receivers are arranged to be selectively connected to the scale transmitter and each of the data receivers is arranged with control switches adapted to be actuated when the data receiver, in following the scale transmitter, indicates that there is a certain quantity of material in the weigh hopper of the scale. To accommodate more than a single material, there are several data receivers arranged one for each of the materials to be included in a batch and each of the data receivers after controlling the cutoff or flow of that material remains at the last indication so that an operator by observing the various data receivers can tell how much of each material was weighed out for that particular batch. When the batch has been completely weighed out, i.e., all of the materials have been weighed into the hopper, the indicating system indicates that fact and the operator may then cause the materials to be discharged or this discharge may take place automatically provided each of the materials was weighed out within a certain tolerance as indicated by switches on the data receivers.

A preferred embodiment of the invention is illustrated in the accompanying drawings.

In the drawings:

Figure I is a generally schematic front elevation of a weighing scale system including the improved data transmitting and receiving equipment for remote control of the batching system.

Figure II is a simplified schematic illustration of a data transmitting and receiving system for causing indication and control at the remote station or at the control station according to the movement of the scale mechanism.

Figure III is a side elevation, with parts shown in section, of a portion of the data receiving system including those portions for setting up the quantities of material to be weighed out and for indicating the progress of the weighing operation.

Figure IV is a fragmentary detail of a portion of the equipment as seen from the line IV—IV of Figure III.

Figure V is a front elevation of the data receiver indicating mechanism as seen from the line V—V of Figure III showing the arrangement of the controls for initiating the switching operations for cutting off flow of material to the weighing scale hopper.

Figure VI is an enlarged side elevation, with parts shown in section, of the indication portion of the data receiver.

Figure VII is a fragmentary isometric view of a portion of the indicating mechanism showing the switch and cam arrangement for operating that switch that causes final cutoff of the flow of material.

Figure VIII is a similar, generally isometric, exploded view of the switching mechanism of the remote or control indicating mechanism that causes switching for cutting off the rapid flow of material and permitting the slow flow of material into the weighing scale hopper.

Figure IX is a schematic wiring diagram of the various data transmitting systems and of a stepping relay employed for switching the circuits for the various materials.

Figure X is a schematic wiring diagram showing the switching arrangement for controlling the flow of material and indicating the accuracy of the various steps in the process.

Figure XI is a simple schematic diagram illustrating the connection of the switching arrangements to the feeders that cause the flow of the materials into the weigh hopper.

These specific figures and the accompanying description are intended merely to illustrate the invention, but not to impose limitations on its scope.

Referring now to Figure I, material for batches contained in hoppers 1 and 2, that are representative of supply hoppers for the materials for the batch, are fed by vibratory feeders 3 and 4 into a hopper 5 supported by links 6 depending from a lever system of a weighing scale 7 having an indicating mechanism 8. The hopper 5 and weighing mechanism 7 are supported on standards 9 at a sufficient elevation to allow a receiver 10 to be brought under the hopper 5 in position to receive material discharged from the hopper. The receiver 10 may be carried on a conveyor or a cart or any other suitable transportation means.

The data transmitter 11 mounted on top of the indicating mechanism 8 converts the indicated magnitude of load into an electrical quantity that may be transmitted through a cable 12 to a control station 13. The control station 13 comprises a plurality of data receivers 14 and a supervisory control section 15 which is adapted to receive signals from the data receivers 14 and transmit corresponding signals through a control cable 16 to operating motors 17 and 18 of the vibratory feeders 4 and 3 respectively.

While only two material supply hoppers 1 and 2 are shown, it is to be understood that any desired number may be employed. Likewise, any number of weighing scales may be employed with suitable data transmitters 11 serving to transmit weight indications from the weighing mechanism to the control station 13. In Figure I, three data receivers are shown in the control station 13 in connection with the supervisory control.

In the operation of the device as shown in Figure I, a greatly simplified version of a commercial installation, the operator watches the supervisory control 15 and when it indicates that the batch has been assembled in the scale hopper 5 he trips, by means of a lever 19, a discharge gate of the hopper 5 to drop the batch from the scale hopper 5 into the receiver 10. Ordinarily the control is arranged so that an output signal of the supervisory control 15 is provided after the batch has been assembled and is used to operate mechanism corresponding to the handle 19 so as to open the discharge gate 20 of the hopper 5. Thus the operation is made completely automatic or under the control of a push button station 21 of the supervisory control.

Referring now to Figure II, the data transmitter 11 comprises a soft iron rod or armature 22 that is attached to the indicating mechanism of the weighing scale and arranged to move axially through a plurality of coils comprising a primary coil 23 and a pair of secondary coils 24. The secondary coils 24 are normally connected in voltage opposition so that the net voltage of the two coils varies directly as the displacement of the core or armature 22 from the midpoint of the coils.

The data receiver includes a similar armature or core 25 that cooperates with a set of coils including a primary coil 26 and a pair of opposed secondary coils 27.

Electrical power for energizing the primary coils 23 and 26 is obtained from leads 28 and 29 connected through terminals in an amplifier 30 to alternating current power leads 31. The circuit for each of the primary coils 23 and 26 also includes calibrating and current control resistors 33. The resistors 33 are calibrating resistors and are adjustable to cause the data transmitter and data receiver to agree in the transmission of data from the scale to the output of the data receiver.

The secondary coils 24 and 27 of the data transmitter and receiver are connected in a series circuit which includes leads 34, 35 and a selector switch 36. In this circuit, the secondary coils 24 are connected in voltage opposition to each other and in voltage opposition to the combination of the secondary coils 27 of the data receiver so that the voltage between the leads 34 and 35 approaches a minimum or zero when the coil cores 22 and 25 are in the same relative position with respect to their individual coils.

The combination of cores 22 and 25 and coils 23 and 24 and 26 and 27 is the ordinary differential transformer system for the transmission of data. In this arrangement, the core 22 is attached to and driven by the scale mechanism while the core 25 of the particular data receiver is arranged for adjustment by a control knob 37 so that the core 25 may be positioned as desired. The control knob 37 is ordinarily arranged with graduations corresponding to the graduations on the dial of the weighing scale.

The assembly of coils 26 and 27 is carried in a shield 38 that is connected to a strut 39 to an output of a servomotor 40 having a first or power field 41 energized directly from the leads 31 and having a control field 42 energized from the amplifier 30. The connections to the control field 42 include a selector switch section 43 that is part of the stepping switch used to select the proper data receiver for each material during the weighing process.

The servomotor 40 is arranged with one or more cams 44 arranged to cooperate with switches or contacts 45 that may be connected in circuit with the feeder motors 17 and 18 to control the flow of material from the supply hoppers into the weighing scale hopper.

In this arrangement, the servomotor 40 attempts to drive the combination of coils in the shield 38 to a position relative to the core 25 so as to balance or match the position of the core 22 relative to the coils 23 and 24. Thus with no load on the weighing scale, the core 22 is positioned near the bottom of its coil assembly. Likewise, the core 25, is positioned according to the desired cutoff indication which may be somewhere near midscale for the weighing scale. The servomechanism in attempting to cause the core and coil assemblies to match, drives the coil assembly upwardly as far as permitted by stops on the servomechanism. As the load on the scale increases and the core 22 rises relative to the coil assembly, the servomotor, when the core 22 comes within the range of allowable motion lowers the coil assembly 26 and 27 in the frame 38 so as to follow the motion of the core 22 to maintain the same relative position between the coils and cores. In so doing, the servomotor rotates its cam 44 and, at a particular point in the rotation, causes the cam to close contacts 45 thus controlling the feeders supplying the material to the weighing scale.

Preferably, the allowable travel of the servomotor amounts to approximately 1/20 of the weighing capacity of the weighing scale. Thus if the core 22 has an allowable movement of two inches and the core and coil assembly 25, 26 and 27 is of the same size as the transmitter assembly, the allowable travel of the frame 38 as driven by the servomotor 40 will be approximately one-tenth of an inch. The adjustable range of the core 25, as provided by the knob 37, results in the same travel of the core 25 as may be produced by the weighing scale at the core 22.

Thus the control knob 37, in positioning the core 25 to a position relative to the cutoff of the servomechanism, provides a comparatively simple easy method for setting the cutoff point and the motion of the servomotor in positioning the coil assembly provides anticipation of the approach to the cutoff point as may be required with some materials to avoid overfilling or overrun of material. Therefore, in the ordinary assembly one or more switches are operated by the servomotor in sequence to diminish the rate of feed of material as the desired cutoff weight is approached.

Referring now to Figures III and IV in particular, the data receiving mechanism located at the control station remote from the scale includes the control knob 37 that is used to select the quantity of material to be batched by this particular control mechanism. As shown in Figure III, the control knob 37 is fixedly mounted on a rotatable shaft 46 carrying a worm 47. The worm 47 meshes with and drives a forty-toothed worm wheel 48 that is carried on a shaft 49. The shaft 49 also carries a pulley 50 over which a steel tape 51 is clamped and trained. One end of the tape 51 is connected to a fitting 52 at the upper end of the core 25 of the data receiving transformer. The lower end of the core 25 is connected through a similar fitting 53 to another steel tape 54 which is trained around a lower pulley 55 and connected through a spring 56 to the other end of the first steel tape 51. The tape 51 is preferably clamped to the pulley 50 so as to provide a positive drive between the pulley and the tape so that graduations on a dial 57 attached to the knob 37 may accurately indicate the position of the core 25.

The dimensions of the system are preferably such that a quarter turn of the pulley 50, ten turns of the control knob 37, drives the core 25 through a range corresponding to the maximum travel of the transformer core 22 of the scale transmitting transformer. To keep track of the number of revolutions of the control knob 37, a second dial 58 traveling at one-tenth of the speed of the dial 57 and geared to the dial 57 is provided to cooperate with a reference or index member 59 in indicating the actual graduation to which the core 25 is positioned. Thus the dial 57 attached to the knob 37 indicates the fractional parts of a turn of the knob 37 while the slow speed dial 58 indicates the number of completed revolutions thereby allowing precise settings of the core 25 to be made.

In order that backlash in the bearing supporting the shaft 46 and between the teeth of the worm wheel 48 and the worm 47 may not cause inaccuracies in positioning of the core 25, a take up spring 48a is provided to act between a portion 60 of the frame and the pulley 50 to constantly urge the pulley and the worm wheel 48 in one direction thereby always taking up the backlash in the same direction.

The shield tube 38, supporting or housing the coils 26 and 27, is held in an upper clamp 61 and a lower clamp 62 that are guided by means of flexure plate check links 63 and 64 from a front panel 65 of the assembly so as to be movable along a path generally parallel to the path of the core 25. The actual motion along this path is controlled by the short strut 39 connected to the upper clamp 61 and to an arm 66 (Figure IV) supporting the upper end of the short flexure strut 39. The short arm 66 extends laterally from an axle or shaft 67 that is pivotally supported in bearings 68 and 69. The short shaft 67 is rocked by a downwardly extending arm 70 the lower end of which carries a toothed sector 71 meshing with a pinion 72 on the servomotor output shaft 73. The shaft 73 is driven by the servomotor 40 and driving through the pinion 72, sector 71 and arm 70 tends to rock the shaft 67 and thus raise or lower the shield tube 38 in an attempt to position the coils 26 and 27 relative to the core 25 so as to match the position of the core 22 in the coils 23 and 24 at the weighing scale. The travel of the servomotor and hence the travel of the sector 71 is limited by interference between the sector 71 and frame bars 74 of the assembly. Preferably the clearance permitted is such that the full travel of the sector 71 produces approximately one-tenth of an inch movement of the shield tube 38 thus corresponding to approximately five percent of the total adjustable travel of the core 25.

As was mentioned earlier, the servomechanism output shaft is designed to operate, through cams, a series of switches that control feeders feeding material into a hopper supported by the weighing scale. These switches include a first switch 75 that cooperates with a cam 76 to control the final cutoff or final stopping of the feeders. Likewise, another switch 77 cooperates with the interior of a cup-shaped cam 78 to control the first or dribble cutoff, i.e., the shut off of the high speed feeder to reduce the rate of flow of material onto the scale.

An indicator 79 (see also Figure V) is mounted fixedly on the end of the servomechanism output shaft 73 and cooperates with a fixedly mounted chart 80 to indicate the amount by which the scale mechanism or scale indication fails to reach or match the selected indication or setting of the dials 57 and 58. This indication by the indicator 79 on the chart 80, of course, is valid only when the readings differ by an amount less than the indicating capacity of the chart 80. That is, less than about five percent of full scale indication of the weighing scale.

As was mentioned previously, the servomechanism is arranged through the switches 75 and 77 to control the cutoff of feeders that are feeding material onto the scale.

In order that the system may be adaptable to various conditions, it is desirable that the cutoff points be adjustable. In other words, the amount or anticipation at which the dribble cutoff must be set prior to a final cutoff depends upon the rate at which material is fed onto the scale.

The position of the switch 77 controlling the first or dribble cutoff is set by a control knob 81 (see Figure VIII) which through a pinion 82 and sector gear 83 rotates or positions the switch 77 relative to the servo-driven cup-shaped cam 78. In addition, through the sector gear 83, the control knob 81 also positions a pointer 84 that cooperates with the chart 80 to indicate the setting of the dribble cutoff.

In a generally similar manner, the position of the switch 75 controlling the final cutoff is adjusted by a control knob 85 (see Figure VII) driving a pinion 86 that meshes with and drives a sector gear 87. The sector gear 87 carries a disc 88 that forms a background for the pointers 79 and 84 and that includes an index mark 89 (see Figure V) which cooperates with the chart 80 to indicate the positioning of the final cutoff switch 75.

As may be seen in Figure VII, the cutoff switch 75 is mounted on a generally U-shaped frame 90 which, as may be seen in Figures III and VI, permits the switch 75 to be located far enough from the panel 65 to clear the other parts of the mechanism.

In the operation of the device with no load on the weighing scale and with the knob 37 set to adjust the indication of the dials 57 and 58 to a desired cutoff of desired final weight, such as for example 60 percent of full scale on the weighing scale, the knob 37 is rotated until the number 600 appears on the dials 57 and 58. This positions the core 25 of the receiving linear differential transformer comprising the coils 26 and 27 at a position slightly above the center of the coil assembly. With no load on the weighing scale, the core of the transmitting transformer is at the bottom of its travel, i.e., relatively low compared to the position of the coils. The servomechanism therefore acts trying to raise the frame and shield 38 so as to secure the same relative position of the core and coils at the receiving unit. In order to raise the shield and frame 38, the arm 70 must be rocked forward as seen in Figure III which is produced by counterclockwise rotation of the servomechanism output shaft 73 as viewed from the face of the panel 65 as seen in Figure V. This motion continues until it is limited by the engagement between the sector 71 of the arm 70 and one of the frame support rods 74, this serving as a limit stop to stop the servomechanism with the pointer 79 at the counterclockwise end of the chart 80. As material is fed onto the scale and the transmitting transformer core 22 rises with respect to the coils of the transmitting transformer 11, the core 22 finally reaches a position corresponding to the relative positions of the core 25 and coils 26 and 27. At this time, the input to the amplifier 30 approaches a null condition and as additional weight is added to the scale the amplifier is unbalanced in the opposite direction thus tending to drive the servomotor to rotate the output shaft 73 and drive the coil assembly in the shield 38 downwardly to compensate for the additional upward movement of the core 22. Thus the relative positions of the cores and the coils on the two transformers is maintained by the movement of the coil assembly in the shield 38 at the receiving unit. This movement of the servomechanism output shaft 73, by rotating the cams 76 and 78, operates the switch 75 as the pointer 79 passes the pointer 84 indicating the first or dribble cutoff and the switch 77 as it passes the index mark 89 indicating the final cutoff. After the final cutoff, there is more or less overrun of material into the scale hopper and this is indicated by the continued movement of the indicator 79 beyond the index mark 89. When the scale indication reaches the value selected on the dials 57 and 58 and the servomechanism is balanced, the indicator 79 comes to rest at a zero graduation of the chart 80 thus indicating that the system has balanced and that the correct amount of weight is then in the hopper of the weighing scale.

The details of construction of the cam and switch carriers in the adjustable cutoff mechanism are illustrated in greater detail in Figure VI. As shown in this figure, a control shaft 91 for the control knob 81 is journaled in a bezel 92 fixed to the panel 65. The various indicators and the rotatable background disc 88 are concentrically mounted with respect to the servomechanism output shaft 73. The assembly comprises a first bearing sleeve 93 pressed into the panel 65. The end of the sleeve 93 serves as a bearing for the background disc 88 carrying the final cutoff index 89. The other end of the sleeve 93 serves as a bearing for the sector 87 located behind the panel and connected to the background disc 88 by a stud 94 passing through a slot in the panel 65. Rotatably journaled in the bearing sleeve 93 is a second sleeve 95 that is pressed into and that turns with the sector 83 of the dribble cutoff mechanism. The sleeve 95 extends to the forward side of the panel 65 and carries the indicator 84 which indicates the set point for the dribble cutoff. Next in the assembly is a third sleeve 96 equipped with a locking ring 97 which along with the indicator 84 turns with the second sleeve 95. The locking ring 97 permits disassembly of the unit. The moving indicator 79 is mounted on a blind sleeve 98 that fits over the end of the servomechanism output shaft 73 and is clamped thereto by a collar 99 sleeved over a reduced diameter and slotted section of the sleeve 98. The limits of adjustment for the dribble switch 77 is controlled by a stud 100 set into the panel 65 in position to interfere with movement of the sector gear 83. Travel of the U-shaped frame 90 carrying the switch 75 is limited by interference between the stud 94 and the ends of the corresponding slot in the panel 65.

In many automatic weighing operations it is desirable to indicate either electrically or visually the accuracy with which the weighing operation was carried out. When several materials are to be batched into a common hopper, it is furthermore desirable to interrupt the weighing operation should the quantity of any material weighed out be incorrect. This is accomplished in the present unit by providing a pair of tolerance switches 101 and 102 (Figure IV) that are operated by adjustable studs 103 and 104 set in a flange 105 of an arm 106 attached to the shaft 67 that is rocked by the servomechanism. The adjusting studs 103 and 104 are set so that neither switch is operated if the load fails to come within a certain tolerance of the selected weight, one of the switches is operated if the load is within the allowable tolerance plus or minus of the selected weight and both switches are operated if the load exceeds the selected weight by the allowable tolerance.

Suitable electrical circuits utilizing the improved cutoff mechanism are illustrated in Figures IX, X and XI. As shown in Figure IX, alternating current power supplied on leads 110 and 111 is transmitted through a disconnect switch 112 to a first supply lead 113 and return lead 114. These leads supply all of the control circuits for the system.

In the wiring diagrams, in order to easily locate and identify the various relays, contacts and other elements, a numbered key appears along the right hand side of each figure with a line number for each line in which circuit elements appear. On the lines opposite the relay coils are listed lines in which contacts operated by that coil appear. Furthermore, the contacts operated by a given coil are given the same reference numerals for convenience in identifying the various contacts.

Thus, the disconnect switch 112 appears in line 1 of the diagram. Line 2 shows a pair of fuses 115 and 116 arranged to prevent flow of excess current to the leads 113 and 114. A pilot light 117 is shown in line 2. The circuit for energizing the primary coil 23 of the scale transmitting transformer appears in line 3 and comprises a 1000 ohm resistor 118 in parallel with a 5 mfd. condenser 119, this combination being connected in series with a 300 ohm adjustable resistor 120 and the combination being in series with the primary coil 23 thus controlling the magnitude and phase angle of the current flowing in the scale primary coil 23. The adjustable resistor 120 is employed as a scale factor adjustment to insure that the transmitter delivers a certain voltage for each given increment of weight.

The energizing circuit for the primary coil 26 of the receiving transformer is illustrated in lines 5 and 6 of Figure IX and comprises a 1000 ohm resistor 121 bypassed by a 5 mfd. condenser 122 and arranged in series with a 25 ohm resistor 123 and a 300 ohm resistor 124, this combination being in series with the primary coil 26. In this arrangement, the 300 ohm resistor is used as a coarse adjustment of current flow in the primary coil 26 while the 25 ohm resistor is used as a vernier or fine adjustment.

A similar circuit for a second remote receiver is illustrated in lines 7 and 8 and comprises a resistor 125 bypassed by a condenser 126 and arranged in series with a vernier or fine adjustment resistor 127 and coarse adjustment resistor 128. This combination is in series with the primary coil 264 of a second remote receiver.

Similar circuits are provided for additional remote receivers corresponding to other materials and may be added in any number desired. Thus the circuit for the nth material contains a primary transmitting coil 26N appearing in line 9.

The secondary coils 24 and 27 of the scale transmitter and the several receiver transformers are connected in the circuits shown in lines 11–15 inclusive of Figure IX. As shown in this figure, the amplifier 30 has one of its input leads connected first through the scale transformer secondaries 24 then through contacts SR1A, SR2A or SRNA of a stepping relay SR and thence through the secondary coils 27, 27A, or 27N of the various remote receiver transformers and thence through selected balancing voltage sources which may be included in the amplifier, and finally to the return lead 114. In this arrangement of connection of secondary coils to the amplifier 30, each of the remote or receiver transformer secondaries is connected in circuit only when the stepping relay is in the position corresponding to that receiver.

The stepping relay operating coil SRS is shown in line 27 of Figure IX and is arranged to be operated either by time delay contacts TD1 in line 26, TD2 in line 27 or TDN in line 28 or a key-operated switch KS in line 25. These contacts are connected in parallel between the lead 113 and a lead 129 leading to a full wave rectifier 130 arranged to feed direct current through a 100 ohm resistor 131 to the operating coil SRS of the stepping relay. The time delay relays TD1, TD2, or TDN, one for each of the materials, close their contacts after a time delay after the weighing of that particular material has been completed and the weight has been found to be within tolerance. Should any of the weights be off tolerance the corresponding timer will not operate and that condition is indicated on the panel to call the operator's attention to the error and the operator, having determined the magnitude of the error, may elect either to accept the off weight batch or reject it. Should be decide to accept it, he closes the key-operated switch KS to operate the stepping relay to advance the cycle.

Each of the servomechanism motors has its power field 41 continuously energized from leads 132 in line 19 and 133 in line 17. The control windings 42 of the respective motors are energized from the amplifier 30 by way of a lead 134, contacts SR1B in line 17 for the first material, lead 135 from the contacts to the motor in line 18, and then through a return lead 136 to the amplifier. Similar circuits including contacts SR2B in line 20 serve to connect the other servomechanism motors when the respective remote secondary coils 27A or 27N are energized. Thus, in this circuit the stepping relay controls a sequence of events and arranges for proper interconnections of the various circuits as the cycle of weighing the several ingredients of the batch progresses from material to material.

Figure IX also includes in lines 18, 21 and 23 contacts RD which are operated by a hopper discharge relay (RD line 45 of Figure X) that is energized to cause a discharge of material from the weigh hopper. When this discharge relay RD is energized, circuits are completed from the line 113 to the control fields of each of the servomechanism motors so as to energize such motors for rotation in a direction tending to return the servomechanism to its maximum counterclockwise position as indicated in Figure V, thus opening the switches controlled by the servomechanism in readiness for the next batching operation. As each of the servomechanisms reaches its return position it opens its limit switch LSA thus opening the circuit to the control field of the corresponding motor and at the same time preparing a circuit from the RD contact in line 21 through a lead 137, contacts LSA (line 24) of each of the limit switches, normally open contacts RSO, of a reset relay RSO (line 47) for the stepping relay, thence through contacts SRH of the stepping relay SR, a 50 ohm resistor 138 and the stepping relay homing coil. Subsequent closure of the reset relay contacts RSO causes the stepping relay to return to its home position. The SRH contacts are closed in all but the first or number 1 position of the stepping relay.

Referring now to Figure X which shows the relay circuits arranged to control the feeders for feeding material into the scale and control the cycling from one ingredient to the next, it will be noted that as long as the stop button shown between lead 113 and a control lead 139 between lines 30 and 31 is closed the lead 139 is energized. A batching operation may be started by momentarily closing a start button 140 in line 31 so as to complete a circuit from the lead 139 through a slow moving latch relay contact L in line 31 thence to the now closed start button 140, a lead 141, and a coil R of a control relay R and thence to the return lead 114. The control relay R thereupon closes its contacts R in line 32 so as to complete a by-pass or sealing circuit around the start button 140 so that it may now be released without de-energizing the control relay R. The energization of the control relay R supplies power to a second lead 142 which supplies power for all of the material feeding control operations but not the material discharging operations.

Assuming the stepping relay SR to be in its first or home position, its contacts SR1C in line 32 are closed so as to energize a lead 143 connected to a first terminal 144 of a single-pole double-throw material cut out switch 145. Switch 145 is used in the position shown if that particular material is to be included in the batch and is thrown to its other position in case that material is not to be included and the cycle is to by-pass that particular material. If the material is to be included and the switch 145 positioned as shown, the power then flows to an LSC2A limit switch corresponding to the final cutoff switch 75 previously described, and thence through lead 146 to a fast feed relay F1 in line 32. From the lead 146 current may also flow through a slow feed relay S1 contacts in line 33 and through a pilot light 147 indicating that the first material is feeding at the fast rate.

When sufficient material has been fed into the weighing scale hopper so that the servomechanism closes the dribble feed switch 77, shown as limit switch LSC1 in line 34, a slow feed relay coil S1 in line 34 is energized as well as a pilot light 148. At this time, both the F1 relay and the S1 relay in lines 32 and 34 respectively are energized which will cause the feeder to operate at slow speed as indicated in Figure XI.

As shown in Figure XI, power from a power line 148 is fed through normally open F1A contacts then through normally closed S1A contacts leading to a feeder motor 149 and thence to a return lead 150. The feeder motor 149 corresponds to the feeder motors 17 or 18 shown in Figure I. As may be seen in Figure XI, when only the F1 relay is energized, the feeder motor 149 receives the full voltage of the leads 148 and 150 while when both the F1 and S1 relays are energized, a dropping resistor or slow feed resistor 151 is inserted in series by the opening of the normally closed S1A contacts. Preferably the feeder motor 149 is of the vibratory type so that the reduction in voltage resulting from the insertion of the resistance 151 causes the feeder to operate at a reduced amplitude and, therefore, a slow rate of feed. The slow speed may be adjusted by adjustment of the value of the resistance 151.

When the correct weight has been reached as indicated by the servomechanism closing its switch 75, shown as LSC2 in lines 32 and 39 of Figure X, the circuit to the F1 and S1 control relays in lines 32 and 34 is broken and the limit switch LSC by closing its normally open contacts in line 32 energizes a second lead 152 to prepare a circuit to a time delay relay TD1 in line 37. This circuit from the lead 152 includes a first tolerance switch LST–1 having contacts 152a, also shown in Figure IV, and contacts 153 of the second tolerance switch LST–2. If the load on the scale is within tolerance so that the first tolerance switch LST–1 is operated and the second tolerance switch LST–2 is not operated a circuit is completed from the lead 152, through the first and second tolerance switch contacts 152a and 153 to the timer TD1. If the load falls short of the correct weight, neither of the tolerance switches is operated so that the circuit is broken at the first of these switches. If the load is overweight the second switch is also operated so as to open its contacts 153 thereby interrupting the circuit to the timer.

If the first material is to be omitted from the batch, the switch 145 is thrown to its other position so as to energize lead 154 connected directly to the time delay relay in line 37 thus causing the relay to time out and operate. When the time delay relay TD1 in line 37 times out, it closes its contacts TD1 in line 26 (Figure IX) to energize the stepping relay to step it forward one step thereby conditioning its contacts for feeding a second material.

When the final cutoff switch 75, that is the limit switch LSC–2, is operated it also closed its contacts in line 39 to complete a circuit from the lead 142 to a pilot light control circuit lead 155. From this lead one of a set of three pilot lights 156, 157 and 158 are energized depending upon which if any of the tolerance switches LST were operated after the final cutoff. Thus if neither of the tolerance switches is operated, the LST–1 switch has its contacts closed to complete a circuit from the lead 155 to the pilot light 158 in line 40. If the first tolerance switch operated but the second did not, then the circuit is completed from the lead 155 through the first tolerance switch to the second tolerance switch and thence through the lead to the pilot light 157 thus indicating that the batch is of correct weight. If both tolerance switches operate the circuit is directed to the pilot light 156 in line 38 thus indicating that the weight is in excess of the desired amount. Thus the pilot lights indicate the condition or accuracy of the weighing of each of the particular materials and may be used as a guide for the operator in the event that one of the weights is off tolerance thereby interrupting the weighing sequence.

As soon as the stepping relay steps in response to the operation of the first time delay relay TD1 in line 37 it steps to its second position thereby opening contacts SR1–C in line 32 and closing the next corresponding set of contacts SR2–C in line 41. At the same time it transfers the differential transformer control circuits from the first remote receiver to the second remote receiver in lines 11 and 12 and transfers from the first servo-mechanism motor shown in line 17 to the second motor shown in line 20. A second set of relays and controls similar to those illustrated in lines 32 to 40 inclusive are supplied for the second material and are energized through the contacts SR2–C of line 41. At the completion of the weighing of the second material, the final cutoff switch operates its contacts LSC–2B in line 42 corresponding to contacts LSC–2A in line 39 thus indicating on a second set of pilot lights the condition of the second weighing. The second time delay relay TD2 for the second material operates if this material is weighed within tolerance so as to close its contacts in line 27 thus stepping the stepping relay to its third step whence it controls circuits similar to those illustrated for a third material and so on to the $n$th material. When the last or $n$th material has weighed out and its time delay relay TDN operates to step the stepping relay SRS of line 27, it opens the circuits to the F1 and S1 relays for the $n$th material thus interrupting or stopping the feeding operation. At the same time, the $n$th timer closes its contacts TDN in line 30, Figure X, so as to operate a latch close coil LC in line 30. The latch relay has a first contact L in line 31 serving to control the feeding operations during the weighing. The latch relay has a second contact L in line 45 which controls the circuit for the discharge and resetting of the system. Upon operation of the latch close relay, it closes its contacts L in line 45 and an instant later opens its contacts L in line 31. The opening of the contacts L in line 31 opens the circuit to the feeding control relay R and thus extinguishes all of the pilot lights that have been lit as the weighing process proceeded thus indicating to an operator that the system has completed the weighing operation and is now ready for discharge. The operator thereupon closes the start discharge push button 159 in line 45 so as to energize the discharge relay RD in line 45. This relay RD immediately closes, its RD contacts in line 46 thus permitting the push button switch 159 to be released without deenergizing the discharge relay R.

The discharge relay RD upon being energized and operating through circuits not shown causes discharge of material from the weighing scale hopper. When the hopper has been nearly emptied so that the indicator approaches to zero it closes a mercury-magnetic switch 160 to energize a return cutoff relay RCO in line 46. This relay thereupon closes its contacts RCO in line 47 to energize the stepping relay reset relay RSO in line 47 which completes a sealing circuit around the contacts RCO thus holding this relay closed as the weighing scale indicator arrives at zero and opens the mercury-magnetic switch to release the return cut-off relay RCO. As soon as the reset relay RSO in line 47 is energized by the operation of the return cutoff relay it closes its contacts in line 24 to complete the circuit from the supply lead 113 through the limit switches LSA1, LSA2, LSAN, the now closed RSO contacts, the stepping relay home contacts SRH, which are closed as long as the stepping relay is not in its first or home position, and then through the stepping relay homing coil to the return lead 114. Upon the stepping relay reaching its first or home position it closes its SRH contacts in line 48 so as to prepare a circuit to the latch release coil in line 48. This circuit is completed by the reclosure of the RCO contacts line 48 as the indicator of the weighing scale leaves the mercury-magnetic switch 160 on its arrival at the zero position of the scale. When the mercury-magnetic switch releases and closes its relay contacts RCO, the latch release coil LR in line 48 is energized to release the latch relay thereby opening its L contacts in line 45 to deenergize all of the discharge circuits from lines 45 to 48 inclusive and at the same time reestablish the circuit in line 31 from the supply lead 139 to the start button 140. This prepares the circuit for the weighing of the next batch of material.

If desired suitable pilot lights may be added in parallel with the discharge control relay RD in line 45 so as to indicate the progress of the hopper discharging portion of the cycle of operation.

The flexibility of adjustment of the improved system makes it possible to supply the same type of equipment for a wide variety of batching operations thereby reducing the expense incident to designing and constructing special weighing equipment and control equipment for each type of batching operation. The flexibility of adjustment and the remote indication which preserve the indication of accuracy of each of the weighments while weighing out a batch provides unusual accuracy in batching equipment as well as materially increased convenience in use.

Various modifications in the control circuits and equipment may be made without departing from the scope of the invention.

Having described the invention, I claim:

1. In a device of the class described, in combination, first means for generating a signal proportional to the weight of a load, second means having relatively movable parts positioned in closely cooperating relationship for generating a balancing signal according to the relative positions of its parts, calibrated means operatively connected to a first part of said second means for selectively positioning such first part according to the desired size of the signal to be generated by said first means and therefore according to the desired weight of the load, servo means responsive to the difference between the signals from both said generating means for positioning a second part of the second means in a direction to equalize the signals, stop means for limiting the travel of the servo means, and at least one control switch operated by the servo means.

2. In a device of the class described, in combination, a first signal generator for generating a first voltage according to the weight of a load, a second signal generator having relatively movable parts positioned in closely cooperating relationship, electrical control means connected to said signal generators, a motor controlled by said control means, means driven by the motor for moving a part of the second signal generator, function control switches actuated by the motor driven means, and manually operable calibrated means operatively connected to a second part of the second signal generator for selectively positioning such second part according to the desired size of the first voltage and therefore according to the desired weight of the load.

3. In a device of the class described, in combination, a first differential transformer having a movable core for generating a voltage according to a load on a scale, a second differential transformer having a movable core and movable coils, electrical control means connected to the transformers, a motor controlled by said means, means driven by the motor for moving the coils of the second transformer, manually operated calibrated means operatively connected to the core of second transformer for selectively positioning such core according to the desired size of the voltage to be generated by the first transformer and therefore according to the desired weight of the load, control switches operated by the motor driven means, said control means and motor being arranged to drive the second transformer relative to its core in a direction to equalize the generated voltages whereby the rotation of the motor is a measure of the relative positions of the cores of the transformers.

4. In a device of the class described, in combination, a signal generator that generates a voltage proportional to the weight of a load, a feeder for feeding material into the load, a second signal generator having relatively movable parts positioned in closely cooperating relationship, control means connected to the generators, a motor controlled by the control means, mechanism driven by the motor for moving a part of the second generator, control switches operated by said mechanism for controlling the feeder, and manually operable calibrated means operatively connected to the other part of the second signal generator for positioning such other part to select the load at which the switches operate, said control means and motor being arranged to drive the driven part of the generator in a direction to equalize the voltage.

5. In a device of the class described, in combination, a load receiver, feeding means for feeding material into the load receiver, weighing means for supporting the load receiver, a first signal generator for generating a voltage indicative of the load in the load receiver, a second signal generator having relatively movable parts positioned in closely cooperating relationship for generating a voltage according to the relative position of its parts, manually operable calibrated means for positioning a first part of the second signal generator according to the desired size of the voltage to be generated by the first generator and therefore according to the desired weight of the load, a motor arranged to move a second part of the second signal generator through a limited distance, an amplifier connected to said generators for controlling the motor, said amplifier and motor being arranged to move the generator part in a direction tending to equalize the output voltages of the generators, and at least one switch controlled by the motor connected to control said feeding means.

6. In a device of the class described, in combination, a load receiver, a plurality of feeders for feeding a plurality of materials into the load receiver, weighing mechanism for supporting the load receiver, a transmitter signal generator driven by the weighing mechanism for generating a voltage according to the load, a plurality of receiving signal generators having relatively movable parts positioned in closely cooperating relationship, manually operable calibrated means for positioning one of the parts of each of the receiving signal generators, motor operated means for moving another of the parts of each receiving signal generator, an amplifier, a sequence switch for interconnecting the signal generators, motor control and feeder control, said sequence switch being arranged to sequentially connect each of the receiving generators to the amplifier and transmitting generator to connect the amplifier to the motor of the then connected receiving generator, and control switches operated by the motor operated means for controlling the feeders as connected by the sequencing switch, the calibrated means functioning to select the loads at which the control switches operate.

7. In a device of the class described, in combination, a load receiver, a plurality of feeders for feeding material into the load receiver, weighing mechanism for supporting the load receiver, a signal generator operatively connected to the weighing mechanism for generating a voltage according to load, a control receiver having a signal generator having relatively movable parts positioned in closely cooperating relationship corresponding to each of the feeders, manually operated calibrated means for moving a first part of each receiver signal generator, motor means for moving a second part of each receiver signal generator, control switches operable by the motor means for controlling the feeders, the calibrated means functioning to select the loads at which the control switches operate, an amplifier responsive to the signal generators for controlling the motor means, a sequencing switch for sequentially connecting the feeders to the control switches and the corresponding receiver signal generators to the amplifier, and means for operating the sequencing switch when the control switches stop the operating feeder.

8. In a device of the class described, in combination, a load receiver, at least one feeder for feeding material into the load receiver, weighing mechanism supporting the load receiver, a signal generator operatively connected to the weighing mechanism, a receiving signal generator having relatively movable parts positioned in closely cooperating relationship for each feeder, manually operable calibrated means for positioning a first part of each receiving signal generator according to the load at which the feeder shall stop, motor operated means for moving a second part of each receiving signal generator through a limited distance to equalize the voltages of the generators, feeder control switches operable by the motor operated means for stopping the action of the connected feeder, an amplifier responsive to the signal generators for controlling the motor, and control means for sequencing the operation of the feeder.

9. In a device of the class described, in combination, a load receiver, a plurality of feeders for feeding material into the load receiver, a voltage generator for generating a voltage according to the load in the load receiver, a plurality of second voltage generators each having relatively movable parts positioned in closely co-operating relationship, there being one of the second voltage generators for each of the feeders, a motor for each second voltage generator arranged to move a part thereof, manually operable calibrated means individual to each second voltage generator for moving another part thereof, control switches operated by each motor for controlling respective ones of the feeders, the calibrated means functioning to select the loads at which the control switches operate, a sequencing switch operable by the motor operated switches, and an amplifier that is selectively connected to the signal voltage generators and motors for driving the connected motor in a direction to balance the connected second voltage generator with the load responsive voltage generator.

References Cited in the file of this patent

UNITED STATES PATENTS

| | | |
|---|---|---|
| Re. 20,141 | Bliss | Oct. 27, 1936 |
| 2,109,534 | Johnson | Mar. 1, 1938 |
| 2,346,121 | Weckerly | Apr. 4, 1944 |
| 2,581,205 | Reilly | Jan. 1, 1952 |
| 2,602,660 | Shannon | July 8, 1952 |
| 2,607,555 | Noble | Aug. 19, 1952 |
| 2,610,052 | Macgeorge | Sept. 9, 1952 |
| 2,631,027 | Payne | Mar. 10, 1953 |
| 2,664,260 | Saxe | Dec. 29, 1953 |
| 2,675,222 | Clark | Apr. 13, 1954 |
| 2,680,012 | Bozoian | June 1, 1954 |
| 2,793,000 | Klein et al. | May 21, 1957 |
| 2,801,874 | Macgeorge | Aug. 6, 1957 |